Dec. 30, 1952 H. H. DUERR 2,623,822

METHOD OF OBTAINING MULTICOLORED PHOTOGRAPHIC IMAGES OF INCREASED COLOR DENSITY

Filed Dec. 6, 1949

INVENTOR
HERMAN H. DUERR
BY [signature]
[signature]
ATTORNEYS

Patented Dec. 30, 1952

2,623,822

UNITED STATES PATENT OFFICE 2,623,822

METHOD OF OBTAINING MULTICOLORED PHOTOGRAPHIC IMAGES OF INCREASED COLOR DENSITY

Herman H. Duerr, Binghamton, N. Y., assignor to General Aniline & Film Corporation, New York, N. Y., a corporation of Delaware Application December 6, 1949, Serial No. 131,466

6 Claims. (Cl. 95—2)

Figure 1:
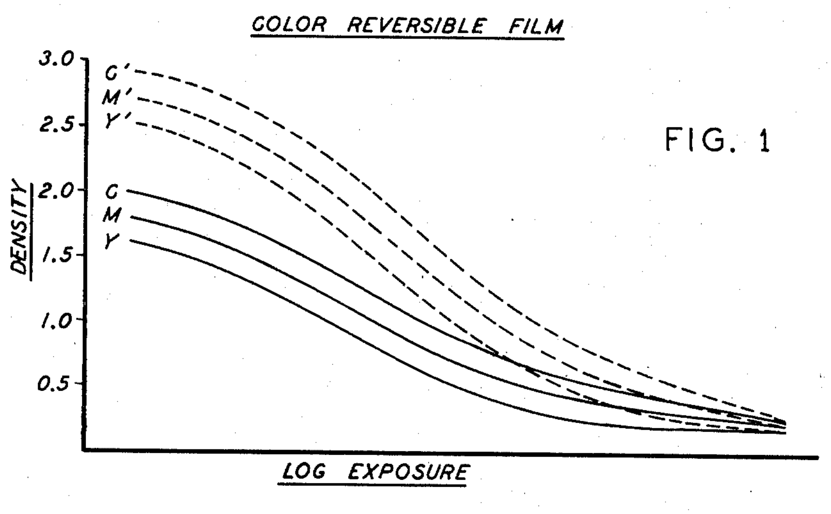

The present invention relates to color photography and more particularly to a process of developing multilayer color materials. This application is a continuation-in-part of Serial No. 704,941, filed October 22, 1946, now abandoned.

In the known color forming development processes a multilayer color film is used in which the differently sensitized silver halide emulsion layers contain diffusion-fast color formers. By exposing the film and developing the same with suitable developers, colored photographic pictures are obtained. At the exposed places dyestuffs are formed from the dyestuff components or color formers together with the developed silver, whereas at the places which have not been exposed to light, the colorless diffusion-fast dyestuff components remain unchanged and do not affect the picture.

As the art is now practiced, there are two general methods by which exposed multilayer color materials are developed or processed to obtain colored photographic images. In the processing of multilayer color reversal film, the exposed film is first developed with a normal black and white developer to produce a negative. After development the black and white negative film, without being fixed, is exposed to general illumination followed by a second development with a color forming developer. During the first and second development the silver halides in all the layers are reduced to metallic silver. The silver present in the layers formed during the first and second development is converted into a salt by any of the known silver-salt formers, commonly known as bleaching baths, and the silver-salt thus formed is then removed by dissolving it in a silver-salt solvent, such as, for example, hypo. The material is washed for a long period of time and then dried. The steps in processing an exposed multilayer color film of the negative or positive types are practically the same with the exception that the first developer (black and white) and second exposure are omitted, i. e., the exposed film is first color developed so that the various layers are developed simultaneously, and the subsequent steps are the same as above.

Multilayer color films containing non-diffusing color couplers in the layers have two distinct failings in that (1) it is difficult to develop out the maximum dye density and speed without producing high color fog, and (2) in order to overcome the low efficiency of the color developing reaction, high concentrations of expensive color formers have to be incorporated into the emulsion layers during the manufacture of the film.

Although the addition of a high concentration of the color formers in the layers above that normally required makes it possible to produce sufficient color density by the regular color processing step, such addition, however, had the disadvantage of increasing color fog in the unexposed areas. Moreover, the residual color formers in the layers after processing have a tendency to adversely affect the light stability of the dyes formed in the layers.

I have found that it is possible to reduce the amount of color forming components in all the layers by one-third to one-half of that normally required and at the same time obtain multicolored photographic images of increased color density by repeating the color development and bleaching steps from two to about four times, after removing the negatively developed silver image of a reversal film with an acidic solution of potassium dichromate or potassium permanganate, or by removing the unexposed silver halide of a negative or positive film by fixing. By utilizing this redevelopment procedure, the maximum speed of the emulsion layers is developed out with a considerable reduction of color fog, and higher color density in all layers, particularly the cyan and magenta layers is obtained.

The photographic multilayer color materials, which may be processed in accordance with the present invention, are color reversible film, color negative film, color reversible material coated on white opaque film, and color paper in which the dyestuff images are produced with color formers already present in the emulsion. The color reversible film consists of an integral tripack emulsion coated on the usual clear cellulose acetate or nitrate film base. Each of the emulsions is sensitized to one of the primary colors, namely, blue, green, and red. The top layer is blue sensitive. A filter layer, yellow in color and blue absorbing, lies under the top layer. Below this filter layer is a green sensitive emulsion layer, and below this is a red sensitive emulsion layer. Each of the three silver halide emulsion layers contains dye forming compounds fast to diffusion which unite during the development of the silver image in aromatic primary amino developing agent to form a dye with the oxidation product of the developing agent.

The color negative film is made up substantially in the same manner as the color reversible film except that different emulsions are employed which may be provided with a layer of clear gelatin between the red sensitive layer and the green sensitive layer. The color reversible material coated on white opaque film is also prepared in the same manner as color reversible film, with the exception that the base consists of an opaque white film. The color paper is likewise constructed in the same manner as the color reversible film excepting that the emulsion is coated on a baryta coated paper base. The process is, however, not applicable to emulsions free from color formers in which the color is formed by selective exposure and development with the color formers contained in the color developer, since the selective sensitivity of the green and red sensitive emulsions is destroyed by the bleaching operations leaving only the natural sensitivities to blue light intact. In view of this destruction, the selective exposures for a second or third color developing step in this type of film is impossible.

As silver is formed during development of a multilayer color film containing non-diffusing color formers in the layers, there is also formed a yellow dye in the blue sensitive emulsion, a magenta dye in the green sensitive emulsion and a cyan dye in the red sensitive emulsion. Combinations of these three printing primaries will produce all of the other colors in the finished film or print. Suitable methods for the preparation of photographic multilayer color materials have been described in the literature relating to color photography, and are, therefore, not described here.

As examples of suitable aromatic primary amino developing agents, there may be mentioned p-aminoaniline, 4-aminodiethylaniline, 2-aminoethylaniline, 4,4'-diaminodiphenylamine, p-aminodialkylanilines, e. g., 4-aminodimethylaniline, 4-aminodiethylaniline, 2-amino-5-diethylaminotoluene, and the hydroxyalkylene substituted 4-aminoanilines disclosed in United States Patent 2,108,243. These developing agents are preferably used in the form of their salts such as the mono- and di-hydrochlorides, since they are more soluble and stable than the free base. These developing agents are characterized by the presence of a free or primary amino group in the phenyl nucleus which enables the oxidation product of the developer to couple with the color former to form a dye image in the emulsion adjacent to the individual particles of the silver image. The silver image may be removed by silver bleaching and fixing in the well known manner to leave the color image in the emulsion.

After processing the exposed multilayer colored material up to and including the color development step, the developed silver is bleached by any of the commonly used bleaching baths. As is well known, all bleach baths contain an oxidizing agent which is an inorganic chemical compound that will oxidize a metallic silver image to form a silver salt, such as, the alkali ferricyanides, i. e., sodium, potassium, and ammonium ferricyanides, alkali persulfates, i. e., sodium and potassium persulfates, alkali bichromates, i. e., sodium and potassium bichromate, salts of bivalent copper, or compatible mixtures of these salts with or without a converting or halogenizing agent dissolved in a suitable solvent, such as, for example, water, with or without the presence of other adjuvants. The converting agent is either potassium bromide, sodium chloride, or sodium thiocyanate, which by reason of a difference in solubility will replace instantaneously any soluble silver salt formed in the bleaching treatment to form difficultly soluble silver bromide, silver chloride, or silver thiocyanate, and thus impel the bleaching reaction to completion. Alkali ferricyanides which form silver salts of low solubility, may be used with or without a converting agent.

The number of times these redeveloping and bleaching steps are repeated depends upon the degree of color density and contrast desired. Usually from 1 to 2 times is sufficient to give the desired contrast both in negative and reversal material. However, if low color former concentrations in the layers are used, and high density and color contrast are desired, these steps may be repeated from two to four times. The number of times these steps can be repeated to yield optimal color density, can be readily ascertained for the various types of color film and paper by a few routine experiments.

Figure 2:
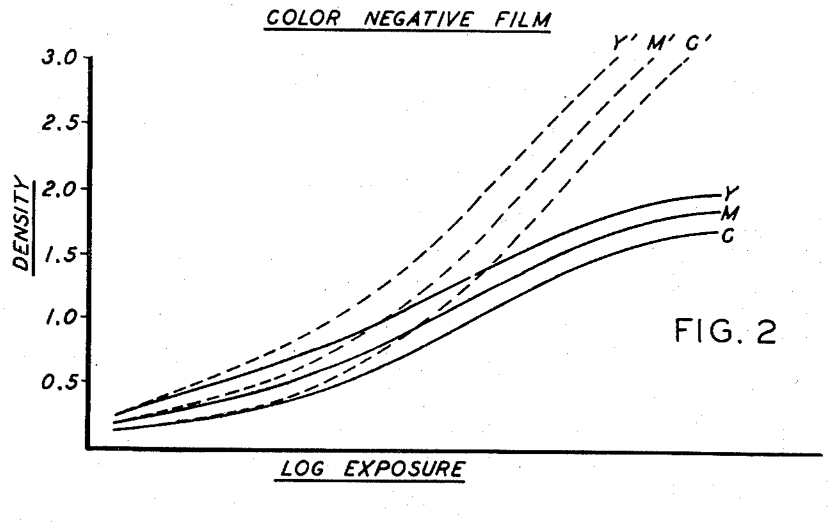

The present invention is illustrated by the accompanying drawing in which Figures 1 and 2 represent typical characteristic curves of the color densities in the individual layers obtained on color positive and color negative materials as described below by way of examples and the color materials treated in the manner set forth.

In Figures 1 and 2, wherein the ordinates represent densities and the abscissa represent the log of exposure, C, M, and Y (which represent magenta, cyan, and yellow, respectively) are the density curves for color positive and color negative materials, respectively, which have been exposed and processed to colored images in the ordinary manner, and C', M', and Y' are the density curves for the same type of material exposed under the same conditions and processed up to and including the color development and bleaching steps, after which the color development and bleaching steps were again repeated and the material processed to color images.

The following examples will serve to specifically describe the invention as applied to multilayer color reversal, color positive and color negative films. These examples should not, however, be construed as limiting or restricting the present invention, but should be considered merely as illustrative.

*Example I*

Two 4" x 5" multilayer color film sheets of the reversal type, such as prepared according to United States Patents 2,179,228, 2,179,239, 2,186,849, and 2,220,187, were exposed in a sensitometer and developed and processed as follows:

The exposed materials were first developed for 10 minutes at 68° F. in a developer of the following composition:

| | Grams |
|---|---|
| Metol | 2 |
| Sodium sulfite | 20 |
| Hydroquinone | 4 |
| Sodium carbonate | 80 |
| Sodium thiocyanate | 5 |
| Potassium bromide | 4 |

Water to make 1 liter.

The devolped films were short stopped for 3 minutes in a 3% aqueous solution of acetic acid, and washed for 2 minutes in running water. In order to remove the developed silver, the washed materials were then treated with a bleach bath of the following composition:

| | | |
|---|---|---|
| Potassium dichromate | grams | 5 |
| Sulfuric acid | cc | 5 |

Water to make 1 liter.

After bleaching, the films were cleared in a bath of the following composition:

| | | |
|---|---|---|
| Sodium sulfite | grams | 50 |

Water to make 1 liter.

The bleached films were washed for 5 minutes in running water.

The washed film was given a second exposure for 3 minutes to light of a No. 1 photoflood lamp 30 inches away from the film, and color developed for 15 minutes in a developer of the following composition:

| | Grams |
|---|---|
| Sodium sulfite | 5 |
| p-Aminodiethylaniline hydrochloride | 4 |
| Sodium carbonate | 40 |
| Potassium bromide | 1 |
| Water to make 1 liter. | |

The color developed film was rinsed for 1 minute in running water, hardened for 5 minutes in a 3% aqueous solution of chrome alum, washed for 5 minutes in running water, and bleached for 10 minutes in a 10% aqueous solution of potassium ferricyanide.

The two bleached film sheets were then washed in water for 5 minutes. One of them was fixed for 5 minutes in a 20% aqueous hypo solution, washed for an additional 5 minutes and then dried. The other was redeveloped in the above color developer for 15 minutes and then bleached, washed, fixed, and dried.

The density curves C, M, and Y of the film sheet processed in the normal manner, as illustrated in Figure 1, were obtained by reading the color densities in the individual yellow, magenta and cyan layer, by employing the proper filters in a photoelectric densitometer in the known manner. From this figure it will be observed that the yellow, magenta and cyan layers are of normal contrast. The contrast of all the layers in the film sheet, which was twice color developed and bleached, was considerably increased as shown by dotted lines C', M', and C', respectively.

*Example II*

A 4" x 5" multilayer color film sheet of the negative type was exposed in a sensitometer as follows.

After color development for 15 minutes in a developer of the following composition:

| | Grams |
|---|---|
| Sodium hexametaphosphate | 1 |
| Sodium bisulfite | 1 |
| p-Aminodiethylaniline hydrochloride | 3 |
| Sodium carbonate (monohydrate) | 60 |
| Hydroxylamine hydrochloride | 1 |
| Potassium bromide | 1.5 |
| Water to make 1 liter. | |

The film was short stopped for 3 minutes in a bath of the following composition:

| | |
|---|---|
| Sodium acetate ____grams | 20 |
| Acetic acid ____cc | 10 |
| Water to make 1 liter. | |

hardened for 5 minutes in a 3% aqueous solution of potassium chrome alum. At this point, white light was turned on. The hardened film was washed for 5 minutes in running water and the washed film then briefly dipped in a bleach bath of the following composition:

| | Grams |
|---|---|
| Di-potassium mono-sodium ferricyanide | 60 |
| Potassium bromide | 15 |
| Di-sodium phosphate | 13 |
| Sodium bisulfite | 6 |
| Water to make 1 liter. | |

This brief treatment converted the colloidal silver in the filter layer below the blue sensitive emulsion layer into silver bromide without noticeably affecting the silver grains developed in the other layers.

The film was then washed and fixed for 3 minutes in a solution of the following composition:

| | Grams |
|---|---|
| Hypo | 200 |
| Borax | 10 |
| Water to make 1 liter. | |

The fixed film was washed for 5 minutes and then fully bleached for 5 minutes in the above described bleaching bath. The bleached film was washed again, re-color developed in the above color developer for 12 minutes, bleached, fixed and washed.

Another exposed sheet of the same multilayer color material was processed in the normal manner by extending the first bleaching operation to 5 minutes and by omitting the subsequent bleaching and re-development operation.

Then density curves Y', M' and C' of the film sheet processed in the normal manner and the density curves Y, M and C of the re-color developed sheet are illustrated in Figure 2.

From this figure, it will be observed that the conventionally processed film had a very low color density, whereas the images of the re-developed and re-bleached film had been increased to the photographically desirable density and latitude shown by doted lines Y', M' and C', respectively. It will also be noted that this improvement in density and latitude was obtained without any noticeable increase in stain.

*Example III*

A strip of 35 mm. multilayer color film of the positive type provided with a sound track and containing non-diffusing color formers for the yellow, magneta and cyan images in amounts corresponding to 15 grams of color former per kilogram of liquid emulsion, was exposed through a color negative picture and developed for 15 minutes in a color developer having the following composition:

| | Grams |
|---|---|
| Sodium hexametaphosphate | 1 |
| Sodium bisulfite | 1 |
| 2 - amino-5-diethylaminotoluene monohydrochloride | 3 |
| Sodium carbonate (monohydrate) | 60 |
| Hydroxylamine hydrochloride | 1 |
| Potassium bromide | 1.5 |
| Water to make 1 liter. | |

The film was short stopped for 3 minutes in a bath of the following composition:

| | |
|---|---|
| Sodium acetate ____grams | 20 |
| Acetic acid ____cc | 10 |
| Water to make 1 liter. | |

hardened for 5 minutes in a 3% aqueous solution of potassium chrome alum. At this point white light was turned on. The hardened film was washed for 5 minutes in running water, and the washed film then treated in a bleach bath of the following composition:

| | |
|---|---|
| Cupric sulfate (pentahydrate) ____grams | 50 |
| Sodium chloride ____do | 50 |
| Potassium bromide ____do | 15 |
| Nitric acid (65%) ____cc | 2 |
| Water to make 1 liter. | |

The rehalogenized film was washed for 5 minutes, and then fixed for 3 minutes in a solution of the following composition:

| | Grams |
|---|---|
| Hypo | 200 |
| Borax | 5 |
| Water to make 1 liter. | |

After fixing, the film was washed for 10 minutes in running water, and allowed to dry.

Another 35 mm. strip of the same multilayer positive color film type except that the amount of color formers used in each of the three layers had been reduced to correspond to 9 grams per kilogram of liquid emulsion, was given an identical exposure through the same color negative.

The exposed color positive film was processed up to and including the hardening step without turning on the white light at this point.

The hardened film was then washed and fixed so as to remove the unused, i. e., unexposed, silver halide. After fixing, white light was turned on and the film washed for 5 minutes in running water.

The washed film was bleached, washed in running water, color developed, short stopped, and hardened The hardened film was then washed, bleached, washed, fixed, washed and finally dried.

The density curves obtained with the film containing the normal amount of color formers and those obtained with the film containing reduced amounts of color formers but subjected to redevelopment, were plotted and compared. It was observed that the color densities in both films were identical.

While I have herein disclosed the preferred embodiments of my invention, I do not desire to limit myself solely to the specific examples, since it will be readily apparent to those skilled in the art that the foregoing procedural steps may be varied and other processing solutions having equivalent chemical or physical properties may be employed without departing from the spirit and scope thereof. Moreover, the same processing steps can be utilized to increase the color intensity of the sound track in multilayer motion picture films. Accordingly, therefore, only such limitations should be imposed as are indicated in the following claims.

I claim:

1. In a process of producing photographic color images on multilayer photographic material comprising a base carrying superimposed differently sensitized silver halide emulsion layers containing color formers which couple with the oxidation product of a primary aromatic amino color developer to yield dye images following exposure and color development of all layers with a primary aromatic amino color developer free of color formers, the improvement which comprises increasing the color density of the images in all the layers of the so-treated material by removing the residual undeveloped silver halide by fixing, converting the developed silver into a redevelopable silver salt by bleaching, and subjecting the material to at least one additional color development of all the layers with a primary aromatic amino color developer free of color formers and at least one additional bleaching treatment which converts the positive silver images in all layers into a redevelopable silver salt removable after the final bleaching step by fixing.

2. In a process of producing photographic color images of the reversal type on multilayer photographic material comprising a base carrying superimposed differently sensitized silver halide emulsion layers containing color formers which couple with the oxidation product of a primary aromatic amino developing agent to yield dye images by exposing said material, developing the same in black and white, removing the silver image by conversion into a soluble silver salt, re-exposing the latent positive image to white light, then developing all layers with a primary aromatic amino color developer free of color formers and bleaching the metallic silver formed into a redevelopable silver salt, the improvement which comprises increasing the density of the dye images thus obtained in all layers by subjecting the so-treated material to at least one additional color developing step of all the layers with a primary aromatic amino color developer free of color formers and at least one additional silver bleaching step to convert the positively developed silver images in all layers into a redevelopable silver salt removable after the final bleaching step by fixing.

3. The process as defined in claim 1 wherein the base is transparent.

4. The process as defined in claim 1 wherein the base is an opaque paper base.

5. The process as defined in claim 2 wherein the base is white opaque.

6. The process of claim 2 wherein the base material is transparent.

HERMAN H. DUERR.

REFERENCES CITED

The following references are of record in the file of this patent:

UNITED STATES PATENTS

| Number | Name | Date |
|---|---|---|
| 2,186,054 | Weaver | Jan. 9, 1940 |
| 2,268,630 | Wilmanns et al. | Jan. 6, 1942 |